Figure 1:
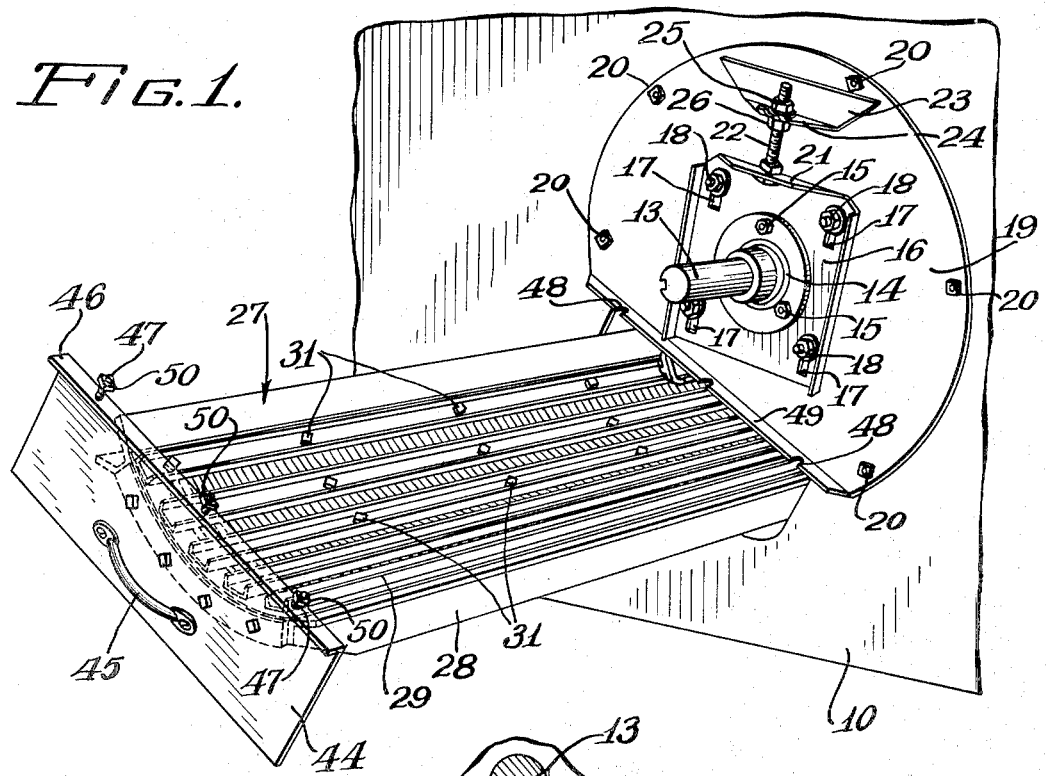

May 1, 1956  D. B. CARLSON  2,743,728
DRAWER TYPE CYLINDER CONCAVE FOR THRESHERS
Filed June 12, 1953

Inventor:
Dwight B. Carlson
Paul O. Pippel
Atty.

United States Patent Office 2,743,728
Patented May 1, 1956

2,743,728

DRAWER TYPE CYLINDER CONCAVE FOR THRESHERS

Dwight B. Carlson, Rapids City, Ill., assignor to International Harvester Company, a corporation of New Jersey Application June 12, 1953, Serial No. 361,281

2 Claims. (Cl. 130—27)

This invention relates to a new and improved drawer type cylinder concave for threshers.

Grain threshing machines are equipped with cooperative cylinder and concave members employed for the purpose of threshing grain. The cylinder and concave have relative rotation and by reason of various surface conformations thereof grain passing between the two members will be threshed. Obviously various grains require different types of cylinders and concaves in order to promote effective threshing and thus it is necessary to facilitate the substitution of various forms of cylinders and threshers within these grain separating housings. Recently, the threshing cylinders of field-traversing harvester thresher machines have been made considerably wider than formerly in order to accomplish what is called in the industry as a "straight through" harvester thresher. In other words, the thresher portion of the machine is substantially the same width as the harvesting portion of the machine resulting in a relatively uniformly dense threshing occurring throughout the full width of the cooperating threshing cylinder and concave. With this advent of wide cylinders and concaves the problem of replacement of these elements becomes more and more difficult because of the size and weight involved.

It is thus a principal object of this invention to provide means for easily removing a concave from a threshing machine.

An important object of this invention is the provision of means in a threshing machine for slidably removing a concave from its cooperating position with respect to the rotatable threshing cylinder.

Still another important object of this invention is the provision of means in a threshing machine for effecting the removal and insertion of a drawer type concave in which the concave may be fixed in operating position merely by the tightening of several screws and conversely the entire concave may be slidably withdrawn merely by loosening these same several screws.

Another important object of this invention is to supply a wedge type locking means for holding the slidable concave in grain operating position.

Other and further important objects and advantages of this invention will become apparent from the disclosures in the following specification and the accompanying drawing.

Figure 2:
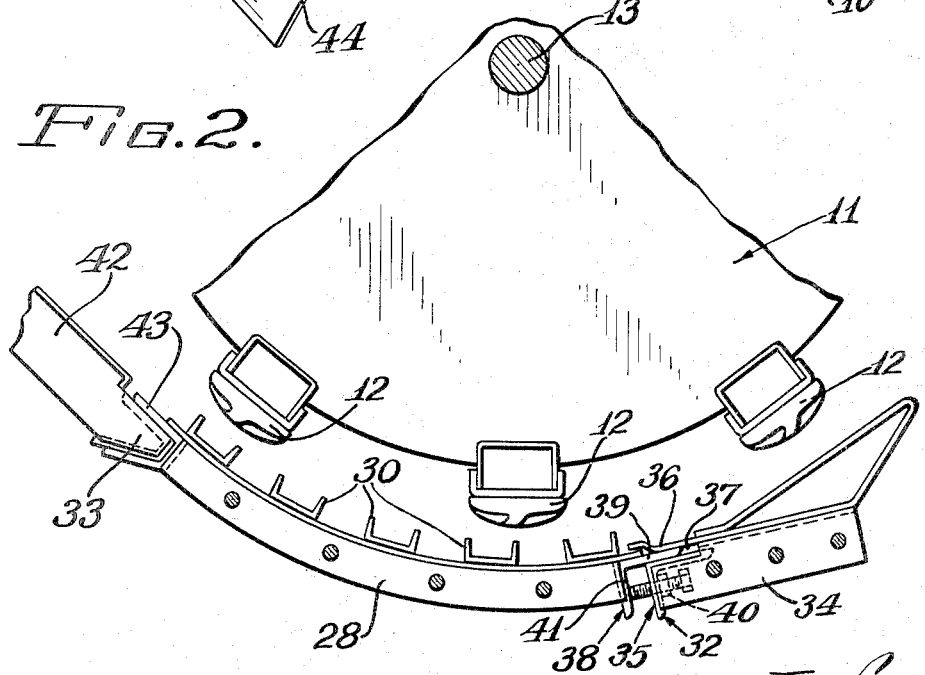

In the drawing:

Fig. 1 is a perspective view of a portion of a threshing machine showing the drawer type concave of this invention in substantially removed position, and Fig. 2 is a side view of a portion of the device as shown in Fig. 1 with the side walls removed permitting visual examination of the cooperative cylinder and concave of this invention.

As shown in the drawing, the reference numeral 10 indicates generally a thresher housing within which the concave of this invention is removably positioned. A thresher cylinder 11 is provided with grain rubbing bars or ribs 12 on the circumference thereof which act to effect threshing of grain passing through the machine. The cylinder 11 is mounted on a shaft 13 which is carried in a bearing member 14 bolted or otherwise attached, as at 15, to a bracket member 16. The bracket 16 is provided with spaced apart, substantially vertically disposed elongated slots 17 through which bolts 18 may pass. The bolts 18 are fastened to a cover plate 19 or the like which may be removably fastened to the thresher side walls 10 by means of bolt fasteners 20. The bracket member 16 includes a forwardly bent flange 21 at the top thereof for the purpose of supporting a substantially vertically disposed bolt member 22. The bolt 22 is fixedly attached to the flange 21 and thus movement of the bolt 22 effects simultaneous movement of the bracket 16. An angle member 23 is welded or otherwise fastened to the cover plate 19 with one wall or side thereof 24 projecting forwardly and lying substantially parallel to the forwardly bent top flange of the bracket 16. The bolt 22 is adapted to pass upwardly through the side 24 of the angle 23 and by means of cooperating nuts 25 and 26 engaging the threaded shank of the bolt 22 on the upper and lower sides of the wall 24 the bolt is adjustably secured thereto. The position of the bolt 22 and thus also the cylinder-carrying bracket 16 may have vertical adjustment.

In the adjustment of the cylinder 11 the bolts 18 are loosened whereafter the nuts 25 and 26 are turned in the desired direction in order to accomplish a raising or a lowering of the cylinder. When the proper adjustment has been completed, the nuts 25 and 26 are tightened against the flange 24 of the angle bracket 23 and the bolts 18 are retightened so that they hold the bracket 16 in fixed position with respect to the cover plate 19. If it should be desirable or necessary to effect a removal of the entire cylinder, this can be accomplished by taking out the bolts 20 and moving the cylinder with its unitary cover plate 19, bracket 16 and adjusting means therefor, laterally outwardly of the housing 10. However, in the present invention we are not primarily concerned with the cylinder, but rather are concerned with the removing of a concave 27 which will cooperate with the rotatable cylinder 11 for good grain threshing and yet may be slidably removed from its operating position in the threshing machine.

The concave 27 is provided with a frame structure 28 on which is mounted the grate or concave proper 29. As shown in Figs. 1 and 2, the rib members 30 of the concave are in the form of upwardly opening channel members. It is these transversely disposed ribs or grate bars 30 which cooperate with the grain rubbing bars 12 of the cylinder 11 to cause threshing of grain which may be fed between the cylinder and concave. As a rule, the concave 27 will be utilized for the threshing of all types of grain but it is often desirable to change the type of ribs which are employed thereon. Thus it is necessary for efficient threshing of all types and conditions of grain to be able to remove the open channel bars 30 and replace them with various other cross ribs of different surface conformations. In order to accomplish this removal of the ribs 30, it is merely necessary to withdraw the concave 27 from its position within the thresher housing 10 and thereafter remove bolts 31, whereafter the open top channels 30 may be removed and replaced by other ribs. In the event the entire concave 27 were not removable, and this has been true of many threshing machines, it was necessary for the operator to first remove the threshing cylinder from the machine and then climb into the space previously occupied by the cylinder and from that awkward position effect removal and replacement of concave grate bars.

The present invention contemplates the slidable removal of the concave to enable easy servicing of the concave and replacing of any of the component parts thereof, or for that matter the entire concave. Ways or track means 32 and 33 are provided within the housing 10 adjacent the forward and rearward edges of the concave respectively. The first way 32 positioned at the forward end of the threshing machine is mounted on frame structure 34 which is rigidly positioned between the side sheets or walls of the thresher 10. The way 32 includes an angle member 35 and an upwardly spaced-apart lip or guide member 36 defining a slot or opening 37 therebetween. The forward edge of the concave 27 is equipped with an angle member 38 having a forwardly extending side 39 which is adapted to slidably engage the way 32 and more particularly the mouth or slot 37 between the vertically spaced members 35 and 36. Adjustable set screws 40 are provided in the angle member 35 and may be moved forwardly and rearwardly of the longitudinal direction of the threshing machine of this invention. The set screws, when tightened, cause a rearward moving of the concave 27 by an abutting of the angle member 38 by the forward ends 41 of the set screws 40.

The second way 33 lies parallel to the forwardly spaced way 32 and is disposed at the rearward edge of the concave within the thresher housing. This way or track means 33 is mounted on and forms an integral part of a frame structure 42. The forwardly projecting end of the way 33 is substantially V-shaped and is adapted to have an outwardly opening V-shaped rearward edge 43 of the concave slidably engage therewith. The V-shaped member 43 is open at its rearward edge and thus fits over the cooperative V-shaped way or bracket.

It is thus apparent that with the structure available the concave 27 with its opposed side edges equipped with track engaging means may be slid inwardly and outwardly from a position within the housing 10 directly beneath the threshing cylinder 11. When it is desired to slide the drawer concave 27 the set screws 40 are loosened providing a slack space between the angle members 35 and 38 which permits the concave to move slightly forwardly and thus alleviating the wedge action between the snugly engaged V-shaped members 33 and 43 at the rearward edge thereof. At all times the concave drawer 27 has a minimum of fore and aft movement but the loosening of the set screws 40 permits sufficient slack so that the concave may easily slide on the track members provided. When it is desired to reset the concave 27 in operating position, the drawer is pushed inwardly of the housing 10 on the longitudinally spaced apart, parallel track means 32 and 33 and thereafter the set screws 40 are tightened causing the ends of the screws 41 to abut and move the angle member 38 of the concave 27 whereupon the rearward edge of the concave 27 is lockingly wedged by reason of the engagement of the V-shaped members 33 and 43.

As shown in Fig. 1, the outer end of the concave 27 is provided with a sheet metal cover 44 which mates with the cover 19 of the cylinder and forms an enclosure for the concave. A handle 45 is mounted on the drawer cover 44 and enables an operator to conveniently pull or push the cylinder drawer 27, as desired. The upper edge of the drawer cover 44 is bent outwardly at right angles, forming a flange or lip 46. Spaced apart screw members 47 are fixedly mounted in the flange 46 and are adapted to engage open sockets 48 within a lower forwardly bent lip or flange 49 of the cylinder cover plate 19. Thus, when the drawer concave is in position in the thresher, the flanges 46 and 49 are disposed one above the other and, by means of nuts or the like 50 engaging the upper edges of the screws 47 the abutting flanges 46 and 49, may be drawn together and held in fixed position during all normal operation of the thresher of this invention.

In operation, the threshing machine of this invention is used in the normal manner. When it is desired to thresh a different type or different condition of grain, the operator may change the type of concave grate bars by removing the entire concave and thereafter taking off the presently used bars and replacing them with bars of different surface conformations. This may be accomplished by initially loosening the nuts 50 and then loosening the set screws 40, whereupon the drawer concave is pulled laterally outwardly by the operator manually pulling on the handle 45. When the concave has been sufficiently withdrawn to enable the operator to have access to the concave grate bars, bolts 31 are removed whereupon the open channel ribs or grate bars 30 may be taken out and other grate bars put in. When this change has been completed the bolt members 31 are again tightened with respect to the frame portion 28 of the concave and the drawer slid inwardly on the ways 32 and 33. At this time the set screws 40 are drawn up tightly, causing the concave to be securely wedged in fixed operation position with respect to the threshing cylinder 11. The housing is then completed by tightening the nuts 50, making a complete enclosure for the side walls of the thresher.

Numerous details of construction may be varied throughout a wide range without departing from the principles disclosed herein and I therefore do not propose limiting the patent granted hereon otherwise than as necessitated by the appended claims.

What is claimed is:

1. A supporting means for a drawer element comprising a housing, spaced apart fixed first and second ways in said housing, said first way including spaced elements having a slot therebetween, and adjustable screw means arranged and constructed to move parallel to said slot, said second way including a V shape projection, a drawer element including a projecting lip along one edge thereof adapted to engage the slot in the first way, and an outwardly opening V shape member projecting along a spaced apart parallel edge of said drawer element and adapted to slidably engage the V shape projection on the second way, whereby the drawer element may have slidable engagement with the housing and may be fixedly positioned within said housing by extending the adjustable screw means to effect a movement of the concave and its outwardly opening V shape member into edging relationship with said second way.

2. A device as set forth in claim 1 in which cover and handle means are provided at one end of said drawer element.

References Cited in the file of this patent

UNITED STATES PATENTS

| | | |
|---|---|---|
| 717,226 | Liebich | Dec. 30, 1902 |
| 837,515 | Stephens | Dec. 4, 1906 |
| 991,477 | Buchanan | May 9, 1911 |

OTHER REFERENCES

Machines for the Farm, Ranch and Plantation by Turner and Johnson, Copyright 1948, page 497.